Sept. 15, 1970   F. C. BADALICH   3,529,147
LAMP TURRET ASSEMBLY WITH ENERGIZING AND ALIGNING DEVICE
Filed March 7, 1968
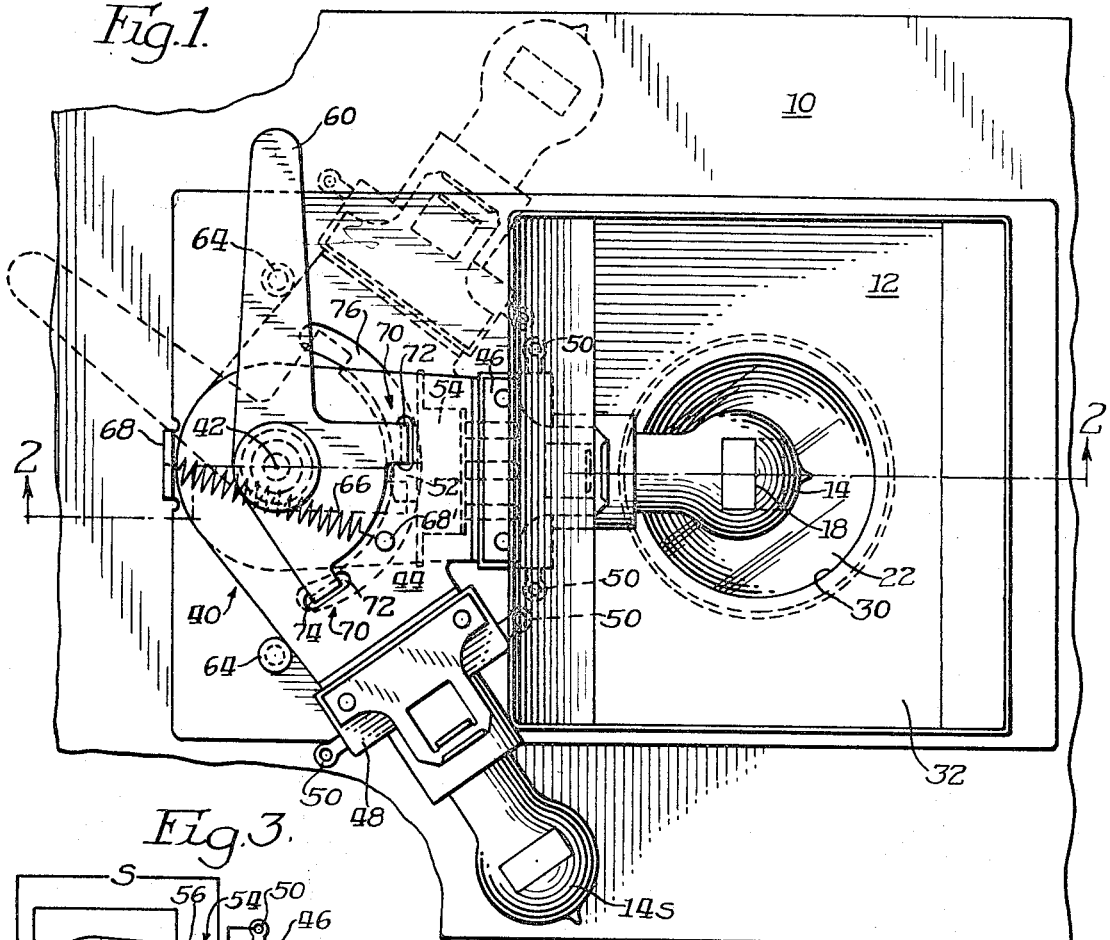
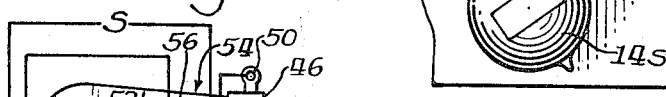
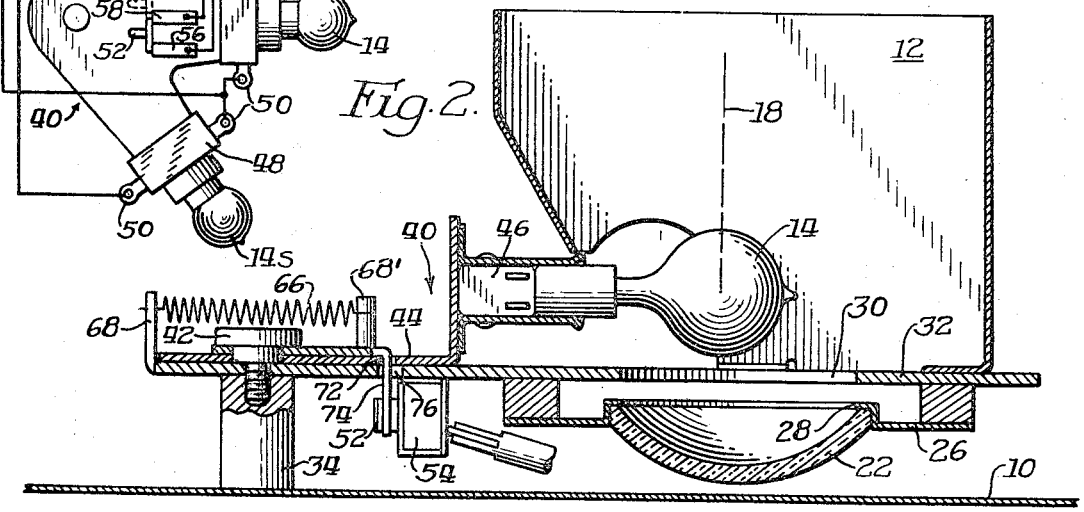
Inventor:
Frank C. Badalich.
By William L. Russell
John E. ...
Attys United States Patent Office 3,529,147
Patented Sept. 15, 1970

3,529,147
LAMP TURRET ASSEMBLY WITH ENERGIZING AND ALIGNING DEVICE
Frank C. Badalich, Chicago, Ill., assignor to Bell & Howell Company, Chicago, Ill., a corporation of Illinois
Filed Mar. 7, 1968, Ser. No. 711,302
Int. Cl. F21v 19/04
U.S. Cl. 240—37     5 Claims

ABSTRACT OF THE DISCLOSURE

A primary lamp aligned in an optical path and a spare lamp are supported on a turret which is adjustable to selectively and positively position the spare lamp in the optical path. The turret assembly carries structure to energize the spare lamp only after it has been aligned in the optical path.

---

The present invention relates to a lamp turret assembly supporting at least a primary lamp and a spare lamp, and particularly to a turret mechanism ensuring positive alignment of the lamps in an optical path and energization of only the lamp in the path.

Many machines require illumination from lamps for usefulness. In these machines, the lamp must be accurately aligned with an optical path therethrough. In some of these machines, such as projectors, which are used before an audience or a class, it is desirable and necessary to have a spare lamp ready for immediate insertion in the optical path when the primary lamp fails. Because of the requirement for accurate alignment of the lamp in the optical path, most machines have a single fixed lamp socket. Thus, upon failure of the primary lamp, the operator must wait for the lamp to cool sufficiently to touch it, obtain the spare lamp, remove the lamp housing, insert the new lamp, and replace the lamp housing. This lamp cool-down period and replacement procedure usually disrupts the presentation for several minutes.

Others have suggested mechanism to enable immediate lamp change-over. Many of these mechanisms enable interchange of low voltage lamps where arcing between the lamp and a live socket does not often cause premature failure of the spare lamp. In structures requiring lamps energized at line voltage, however, extremely complex mechanisms are required to de-energize a socket and energize another. Even with these complex mechanisms, the interchangeable sockets are often not as accurately aligned in the optical path as with a fixed socket.

The instant invention seeks to overcome the shortcomings of the prior art and has a primary object of providing a simple lamp turret assembly for assuring positive alignment of the lamp in the optical axis, and energization of only the socket properly aligned.

Another object of the present invention is to provide a pivotable turret assembly having a first lamp positioning movement, and a second energizing movement.

Yet another object of the invention is to provide a reversible turret which can be adjusted to replace a first expired lamp, and after replacement of that lamp, reversibly adjusted to move the replacement lamp into optical alignment upon failure of the second lamp.

Further and other objects will be apparent from the following description when read with the accompanying drawings in which like numerals refer to like parts.

In the drawings:

FIG. 1 is a plan view of the lamp turret assembly;

FIG. 2 is an elevational view of the lamp turret assembly taken along lines 2—2 of FIG. 1; and FIG. 3 is a schematic showing of the power circuit for the lamp turret assembly.

Referring now to FIG. 1, a lamp utilizing apparatus, such as an overhead projector, is defined by a typical housing 10. Within the housing 10, a substantially enclosed lamp chamber 12 is ordinarily provided. As is conventional, an aperture is provided to permit passage of light rays from a lamp such as primary lamp 14, within the chamber through optics (not shown) aligned with an optical axis 18 (shown aligned with the center of lamp 14 in FIG. 1 and by a dashed line in FIG. 2). Primary lamp 14 is aligned on axis 18 in front of a reflector 22, disclosed as a separate component but which may be interior of the glass envelope of the lamp. Since optical axis 18 is fixed, it is clearly important that the illumination axis of the lamp 14 be aligned with that axis.

For the purposes of this disclosure, the lamp in the optical axis 18 is described as a primary lamp 14, and the lamp in the turret, but not in use, is described as secondary or spare lamps 14s.

In this preferred embodiment, a reflector support member 26 maintains alignment of reflector 22 to enable the reflector to concentrate light from lamp 14 and reflect that light along optical axis 18. Light passes back and forth to reflector 22 through an opening 28 in support member 26 and an opening 30 in a turret support frame 32 to which reflector support member 26 is attached. A spacer 34 mounts turret support frame 32 within housing 10.

As seen in FIG. 1, a turret 40 is mounted on support frame 32 for pivotable rotation between two positions. Rotation occurs about a fixed axis 42, so that the turret is movable between a first position (solid lines) and a second position (dotted lines).

Turret 40 includes a base portion 44 on which a primary lamp socket 46 and a secondary lamp socket 48 are mounted in angularly spaced relation one to another. Lugs 50 are provided on both sockets to connect the sockets in power circuitry (see FIG. 3) for selective energization of the lamps. Power through selected lugs 50 is turned "on" and "off" by switch means 54, disclosed as a single pole double throw slide switch. It is to be understood a toggle switch or other multi-position switch can also be used as the socket energization control means. The switch controls energization of the sockets when the sockets are aligned in the optical axis, and has two "on positions." In the first "on" position, lamp 14 is energized and in the second "on" position, lamp 14s is energized when it is in optical path 18.

Referring to the circuit diagram in FIG. 3, switch 54 is seen to be connected to a lamp energizing source S so that a slide 52 can complete a circuit between one of a pair of contacts 56, and a common contact 58. Contacts 56 are wired with the lugs 50 defining one side of the circuit through sockets 46, 48. The common contact 58 is wired to the sockets as the other side of the power circuit therethrough. When slide 52 is in the position as shown in solid lines in FIG. 3, socket 46 is energized. However, when slide 52 moves to the position 52′, socket 48 is energized. Positioning of slide 52 will be more particularly described later.

Turret 40 is movable about pivot axis 42 into alternative positions by a link means 60. In these positions, either lamp 14 or 14s is aligned in optical path 18. Link means 60 may be moved either by the operator's hand or by linkage connections (not shown) extending to a control either interior or exterior of the housing 10. Link means 60 is shown as a link element mounted for pivotal movement about turret pivot axis 42 coaxially with turret 40. Movement of link 60 rotates turret 40 against one of two stop pins 64, which pins are fixed to turret support frame 32. To assure that turret 40 engages one of the pins 64, an overcenter spring 66 urges the turret to a "home." Overcenter spring 66 is connected between a post 68 extending from turret support frame 32 and another post 68' extending from the turret base portion 44.

Link 60 is connected to turret 40 through lost motion connections 70. These connections include a pair of short slots 72 formed through the turret base portion 44, and a pair of legs 74, which depend from link 60. Legs 74 extend through a cutout 76 in turret support frame 32 so as to engage slide 52 of switch 54 from one side or another depending upon which of the two positions to which turret 40 is adjusted.

Assuming that lamp 14 has just failed, the operator either directly or indirectly actuates link 60 to move it from the solid line position in FIG. 1 to the dashed line position. The initial movement of the link is free and remains so until an edge of leg 74 engages an inner edge of slot 72 in turret base portion 44. After this engagement, link 60 positively rotates turret 40 until overcenter spring 66 takes over and pulls turret 40 against a stop pin 64 wherein the lamp 14s in socket 48 is aligned in optical axis 18.

The socket 48 is aligned with axis 18 slightly before leg 74 of link 60 engages slide 52 to move it to position 52', as seen in FIG. 3. Lost motion connection 70 permits slight over-rotation of link 60 to assure complete movement of slide 52 without altering the alignment of the lamp in optical axis 18. When slide 52 is moved spare lamp 14s is not energized and the socket for primary lamp 14 is de-energized. At a more opportune time, the operator can replace the lamp which failed so that the turret will be ready for positioning of this new lamp in the optical axis when spare lamp 14s fails. This positioning of turret 40 is accomplished in the same manner as above described.

It is to be understood that the embodiment shown is illustrative of the principal operation of a spare lamp assembly which assures positive positioning and ease of manipulation and that certain changes, alterations, modifications or substitutions may be made to the structure of the device without departing from the spirit and scope of the invention as set forth in the appended claims.

The embodiments of the invention in which an exclusive property or privilege is claimed are defined as follows:

1. A turret mechanism for an apparatus utilizing a lamp and having an optical axis in which a lamp is aligned for energization and a turret support frame, the mechanism comprising:
a multiple socket turret mounted on said frame for movement relative to said optical axis;
at least two sockets being carried by said turret for selective positioning of lamps adapted for seating therein in said optical axis;
an overcenter spring to positively urge said turret into a position to ensure aligning in the optical axis a lamp in one of said sockets;
socket energization control means operatively connectable with each socket to permit energizing of a socket to permit energizing of a socket only when a lamp in that socket is aligned in said optical axis; and
link means connected to said turret through lost motion means to move said turret to align one of said sockets in the optical axis and to thereafter actuate said socket energization control means to energize that socket.

2. A turret mechanism as in claim 1 wherein said turret supports two sockets and said energization control means is a two-position slide switch.

3. A turret mechanism as in claim 1 wherein stop pins are positioned on said supporting frame for movement of said turret thereagainst by said overcenter spring.

4. A turret mechanism as in claim 1 wherein the lost motion connection includes a slot in said turret into which connecting portions of said link means extend.

5. A turret mechanism as in claim 4 wherein said connecting portion of said link means extends into a position to actuate said socket energization control means after said link means moves said turret from a first position into a second position.

References Cited

UNITED STATES PATENTS

| 1,432,370 | 10/1922 | Uhlemann | 240—37 |
| 1,667,366 | 4/1928 | Weir et al. | 240—37.1 |
| 1,825,121 | 9/1931 | Owens | 240—37 |
| 2,032,515 | 3/1936 | Troup | 240—37.1 |

FOREIGN PATENTS

| 1,104,215 | 10/1961 | Germany. |
| 797,430 | 7/1958 | Great Britain. |
| 1,097,127 | 12/1967 | Great Britain. |

NORTON ANSHER, Primary Examiner

M. D. HARRIS, Assistant Examiner

U.S. Cl. X.R.

352—198